Dec. 9, 1969   R. W. BARNES   3,482,638
FIREFIGHTING FOAM GENERATOR
Filed April 10, 1968

INVENTOR
ROBERT W. BARNES
BY
*Ernest A. Joerun*
ATTORNEY 3,482,638
FIREFIGHTING FOAM GENERATOR
Robert W. Barnes, Fanwood, N.J., assignor to Walter
Kidde & Company, Inc., Belleville, N.J., a corporation
of New York
Filed Apr. 10, 1968, Ser. No. 720,079
Int. Cl. A62c 35/00; B05b 1/26
U.S. Cl. 169—15                                    8 Claims

ABSTRACT OF THE DISCLOSURE

A firefighting high expansion foam generator having a spherical net and a spherical spray nozzle movably mounted within the net for adjustment with respect to the center of the net.

Background of the invention

The present invention relates to a firefighting high expansion foam generator of the type disclosed in U.S. Patent No. 3,241,617, Mar. 22, 1966, wherein a foaming solution is sprayed onto a net mounted at one end of a wind tunnel and air is forced into the wind tunnel at its other end to drive the solution through the net and thus produce a mass of bubbles which constitute the foam.

In such a generator, the quantity of foam which can be generated is limited to the surface area of the net.

Summary of the invention

Accordingly, an object of the present invention is to provide a firefighting foam generator wherein the surface area of the net is increased without increasing the cross-section of the wind tunnel or similar enclosure.

Another object is to provide such a foam generator wherein the surface area is approximately double that of a planar net mounted in a wind tunnel of equal cross-sectional dimensions.

Another object is to provide such a foam generator wherein the foam solution spray can be adjusted with respect to the net to vary the rate at which foam is generated.

A further object is to provide such a foam generator which is simple and economical in construction and reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing apparatus for generating a highly expanded firefighting foam plug comprising an enclosure having an inlet opening at one end and an outlet opening at its other end, a substantially spherical net in the enclosure having an opening and being connected to the enclosure with its opening facing the inlet opening, air-moving means at the inlet opening for forcing air into the enclosure, and spray means within the net for radially directing onto the net a solution containing a foaming agent, whereby the air forced into the enclosure causes the solution deposited on the net to foam and generate the foam plug which is moved through the outlet opening.

Description of the preferred embodiment

Figure 2:
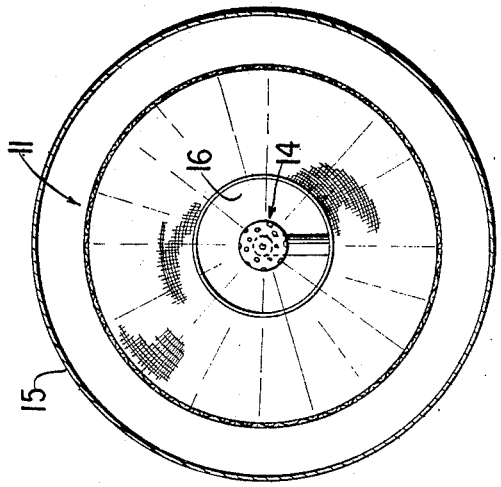
FIG. 2 is a sectional view taken along the line 2—2 on FIG. 1.
Figure 1:
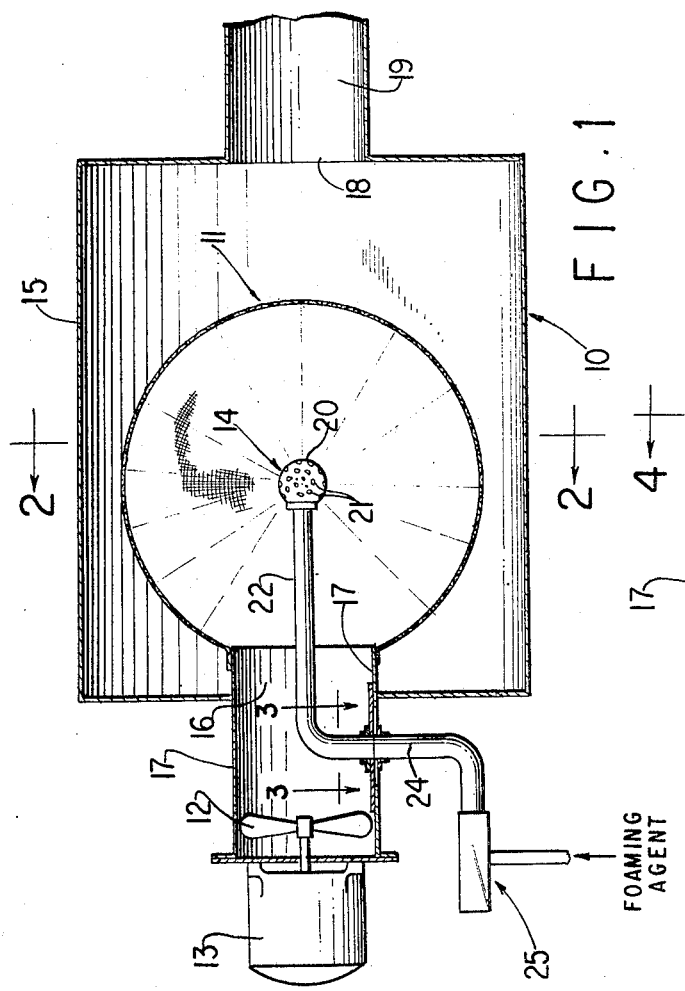
FIG. 1 is a longitudinal sectional view of a foam generator in accordance with the present invention.

Referring now to the drawing in detail and more particularly to FIGS. 1 and 2 thereof, a high expansion foam generator is shown which generally comprises an enclosure 10 serving as a wind tunnel, a substantially spherical net 11 in the enclosure, a fan 12 for forcing air into the enclosure and within the net, an engine or motor 13 for driving the fan, and spray means 14 for radially directing onto the net a solution containing a foaming agent.

The enclosure 10 preferably is a cylindrical tube having a body portion 15, an inlet opening 16 at one end of the body portion provided by a tubular portion 17 extending slightly into the body member, and an outlet opening 18 at its other end provided by a tubular section 19 of reduced diameter for connection of a foam plug delivery tube (not shown) thereto.

By a substantially spherical net is meant that the net is spherical, or is oval or elliptical, with the major axis of the ellipse extending axially with respect to the body portion 15.

The net 11 is formed of a suitable material having minute openings therein for causing the bubbles to be created upon the solution being directed thereon and being forced therethrough by the air current. The net has a circular opening at its upstream side connected to the portion 17. The enclosure and the net 14 are dimensioned to provide an annular space between the inner wall of the body portion 15 of the enclosure and the net for egress of the foam.

The spray means 14 comprise a spherical nozzle 20 having apertures 21 for directing the solution in radial directions onto the net, a central axially extending pipe section 22, and a laterally offset pipe section 24 passing through the tubular portion 17 externally of the enclosure and being connected to a source for supplying the solution. Suitable means for proportioning the concentrate or foaming agent with respect to the water is generally disclosed at 25.

Figure 4:
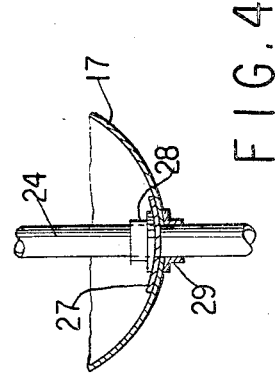
FIG. 4 is a sectional view taken along the line 4—4 on FIG. 3.
Figure 3:
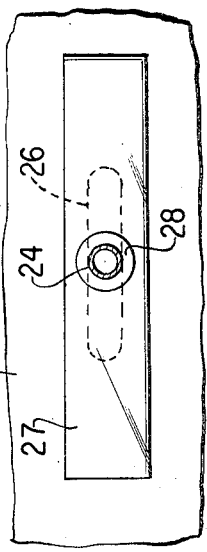
FIG. 3 is an enlarged sectional view taken along the line 3—3 on FIG. 1.

In FIGS. 3 and 4, an arrangement is shown for moving the pipe section 22 and the nozzle 20 thereon to adjust the position of the nozzle with the center or middle of the net 11. This is accomplished by providing an axially extending elongate slot 26 in the tubular portion 17 externally of the enclosure, a curved plate 27 extending lengthwise across the slot 26, and flanged sleeves 28 and 29 secured to the pipe section 24 on the tubular portion 17. The plate 27 is longer and wider than the slot 26 to close the slot at all times regardless of the location of the nozzle.

In view of the foregoing description, it will be seen that the present invention provides an improved high expansion foam generator which is lighter and smaller and can provide foam at a higher rate than generators heretofore devised.

I claim:

1. Apparatus for generating a highly expanded firefighting foam plug comprising an enclosure having an inlet opening at one end and an outlet opening at the other end, a substantially spherical net in said enclosure having an opening and being connected to said eclosure with its opening facing said inlet opening, air-moving means at said inlet opening for forcing air into said enclosure, and spray means within said net for radially directing onto said net a solution containing a foaming agent, whereby the air forced into said enclosure causes the solution deposited on said net to foam and generate the foam plug and move the same through said outlet opening.

2. Apparatus according to claim 1, wherein said inlet opening includes a tubular portion extending into said enclosure, said air-moving means is a fan at the outer end of said tubular portion, and said net is secured to the inner end of said tubular portion at its opening.

3. Apparatus according to claim 2, wherein said spray means include a pipe having a section in said net substantially axially disposed in said enclosure and having an angularly offset section mounted on and extending radially through said tubular portion.

4. Apparatus according to claim 3, wherein said spray means include a substantially spherical nozzle connected to the inner end of said axially disposed section.

5. Apparatus according to claim 4, including means for movably mounting said offset pipe section on said tubular portion to enable said pipe to be moved in an axial direction whereby the location of said nozzle with respect to the center of said net can be adjusted.

6. Apparatus according to claim 5, wherein said last mentioned means include a lengthwise extending slot in the side wall of said tubular portion through which said offset pipe section extends, and a plate slidably positioned over said slot and having said offset pipe section mounted thereon and extending therethrough.

7. Apparatus according to claim 6, wherein said plate is longer and wider than said slot to close said slot at all times regardless of the location of said nozzle.

8. Apparatus according to claim 1, wherein said enclosure is circular in cross-section and said spherical net is dimensioned to provide an annular space between the inner wall of said enclosure for egress of the foam.

References Cited

UNITED STATES PATENTS

| 2,829,874 | 4/1958 | Freeman | 169—15 X |
| 3,420,310 | 1/1969 | Mears et al. | 169—15 |

FOREIGN PATENTS

| 614,937 | 12/1948 | Great Britain. |

M. HENSON WOOD, JR., Primary Examiner

MICHAEL Y. MAR, Assistant Examiner

U.S. Cl. X.R.

239—504